United States Patent [19]

Reniers

[11] Patent Number: 5,230,663
[45] Date of Patent: Jul. 27, 1993

[54] REGULATION OF CVT'S IN MOTOR VEHICLES

[75] Inventor: Dirk L. Reniers, Leuven, Belgium

[73] Assignee: Volvo Car Sint-Truiden naamloze vennootschap, Sint-Truiden, Belgium

[21] Appl. No.: 792,397

[22] Filed: Nov. 15, 1991

[30] Foreign Application Priority Data

Nov. 22, 1990 [BE] Belgium .............................. 09001112

[51] Int. Cl.$^5$ ............................................. F16H 59/00
[52] U.S. Cl. ........................................ 474/18; 474/28; 74/869
[58] Field of Search .................... 474/8, 17, 18, 25, 28, 474/29; 74/869, 866-868

[56] References Cited

U.S. PATENT DOCUMENTS

| | | | |
|---|---|---|---|
| 3,868,869 | 3/1975 | Hunt et al. | 74/866 |
| 4,682,518 | 7/1987 | Takada et al. | 74/867 |
| 4,747,327 | 5/1988 | Itoh et al. | 74/867 X |
| 4,751,859 | 6/1988 | Itoh et al. | 74/867 X |
| 4,838,836 | 6/1989 | Sakai et al. | 474/18 |

FOREIGN PATENT DOCUMENTS

| | | |
|---|---|---|
| 027672 | 4/1981 | European Pat. Off. . |
| 137899 | 4/1985 | European Pat. Off. . |
| 3428708 | 2/1986 | Fed. Rep. of Germany . |
| 1-49750 | 2/1989 | Japan . |

*Primary Examiner*—Ramon S. Britts
*Assistant Examiner*—Roger J. Schoeppel

[57] ABSTRACT

Device for the regulation of a continuously variable transmission in motor vehicles, characterized in that it mainly consists of means for the supply of a hydraulic medium under pressure; control means for the regulation of a pressure; and a controller (13) formed of on the one hand a main valve (14) for the supply and discharge of the hydraulic medium to the regulating cylinder (8) of the continuously variable transmission (1), and on the other hand a control valve (15), whereby the valve bodies (16, 17) of the main valve (14) and the control valve (15) cooperate by means of elastic means, whereby the valve body (16) of the main valve (14) is loaded by a pressure regulated by the control valve (15) and whereby the valve body (17) of the control valve (15) is loaded by a pressure set by means of the above-mentioned control valves.

15 Claims, 3 Drawing Sheets

REGULATION OF CVT'S IN MOTOR VEHICLES

BACKGROUND OF THE INVENTION

1. Field of the Invention

The present invention concerns a device for the regulation of a continuously variable transmission in motor vehicles.

2. Description of the Related Art

As is known, continuously variable transmissions consist of two V-shaped pulleys in between which a V-belt has been applied. Both pulleys are hereby formed of two cone-shaped pulley halves which can move in relation to one another, such that the transmission ratio can be altered by axially shifting the pulley halves of at least one of said pulleys either more or less apart, as a result of which the radius of the belt is altered. The mutual position of the pulley halves is adjusted as a function of different data, by means of hydraulic regulating means which are controlled by electronically driven control valves thereby providing for the moving of one of the pulley halves.

In order to make the continuously variable transmission work smoothly, it is desirable that the movement of the valve body of the main valve, which allows for the supply and discharge of the hydraulic medium to the regulating cylinder of the continuously variable transmission, is regulated by means of a control valve. Embodiments are known in which the valve body of the control valve is electromagnetically driven. These devices are disadvantageous however in that they are relatively complicated and expensive.

SUMMARY OF THE INVENTION

The present invention concerns a device for the regulation of a continuously variable transmission which does not have said disadvantage.

In particular, the present invention provides a device in which the above-mentioned main valve and control valve have an exclusively hydraulic character, whereby use can be made of conventional valves.

To this end the invention concerns a device for the regulation of a continuously variable transmission in motor vehicles, characterized in that it mainly consists of means for the supply of a hydraulic medium under pressure; control means for the regulation of said pressure; and a controller formed of on the one hand a main valve for the supply and discharge of the hydraulic medium to the regulating cylinder of the continuously variable transmission, and on the other hand a control valve, whereby the valve bodies of the main valve and the control valve cooperate by means of elastic means, whereby the valve body of the main valve is loaded by a pressure regulated by the control valve and whereby the valve body of the control valve is loaded by a pressure set by means of the above-mentioned control valves.

In the preferred embodiment the valve body of the control valve is loaded on one side by the force of a compression spring directly supported by the main valve and on the other side by the force of a spring and by a pressure regulated by means of a control valve or servo valve, whereas the valve body of the main valve is loaded on one side by the force of the above-mentioned compression spring which is supported by the control valve, and on the other side by the force of a spring and a pressure regulated by means of the control valve.

In a special embodiment means have been integrated in the controller which, when the control valve fails, provide for such a regulation that an intermediate position of the pulleys of the continuously variable transmission is geared to, such that one can always drive with a fixed transmission ratio.

BRIEF DESCRIPTION OF THE DRAWINGS

In order to better explain the characteristics according to the invention, the following preferred embodiments are described as an example only and without being limiting in any way with reference to the accompanying drawings, where.

DETAILED DESCRIPTION OF THE PREFERRED EMBODIMENTS

Figure 1:
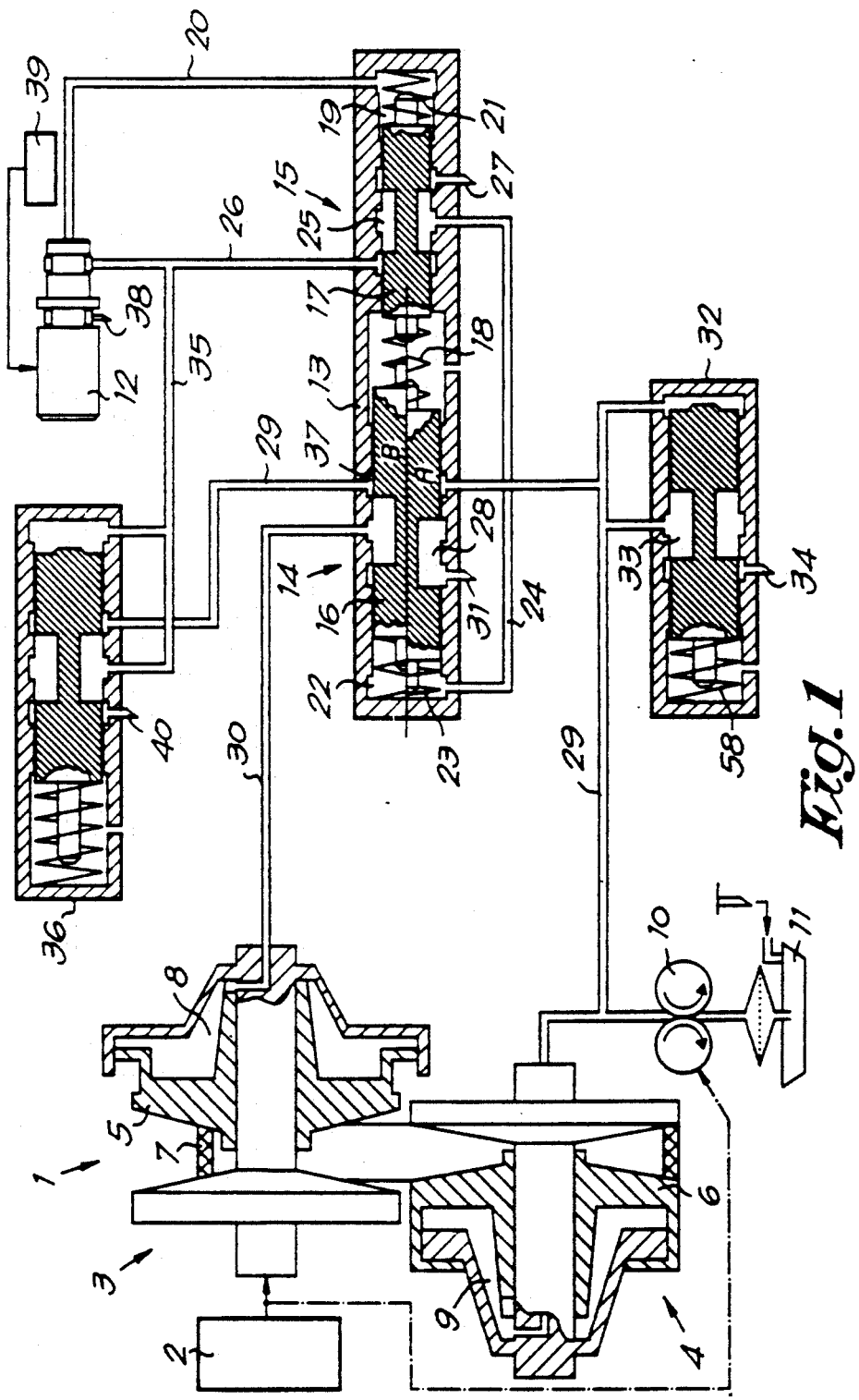
FIG. 1 shows a device according to the invention.

FIG. 1 provides a schematic view of a continuously variable transmission 1, driven by an engine 2. This continuously variable transmission 1 consists as is known of two V-shaped pulleys 3 and 4, each having an axially moveable pulley half 5 and 6, which are coupled by means of a transmission belt 7. The pulley halves 5 and 6 can hereby be moved by means of hydraulic cylinders 8 and 9, whereby the effective diameter of the cylinder 8 is bigger than that of the cylinder 9, such that the cylinder 8 functions as a regulating cylinder.

According to the present invention the continuously variable transmission is regulated by means of a device which consists of means for the supply of a hydraulic medium under pressure, for example a pump 10 driven by the engine 2 which pumps up the hydraulic medium from a reservoir 11; control means such as an electronically driven control valve 12; and a controller 13 formed of, on the one hand, a main valve 14 for the supply and discharge of the hydraulic medium to the regulating cylinder 8, and on the other hand a control valve 15, whereby the valve bodies 16 and 17 of the main valve 14 and the control valve 15 cooperate by means of elastic means, such as a spring 18, whereby the valve body 16 of the main valve 14 is loaded by a pressure regulated by the control valve 15 and whereby the valve body 17 of the control valve 15 is loaded by a pressure set by means of the control valve 12.

A room 19 is provided at one side of the valve body 17 and is connected to the outlet of the control valve 12 via a pipe 20. A spring 21 is provided in room 19 which and exerts a force on the valve body 17. On the other side, valve body 17 is directly supported by the valve body 16 of the main valve 14 by means of the above-mentioned spring 18.

At the side of the valve body 16, situated opposite the side on which the spring 18 exerts its force, a room 22 has been provided and contains a spring 23 therein, has which exerts a force on the valve body 16 opposed to the force of the spring 18. The pressure in the room 22 is regulated via a pipe 24 by means of a port 25 in the valve body 17 of the control valve 15. The port 25 allows for fluid to be either supplied to the room 22 from a supply pipe 26, or to be discharged from the room 22 via a discharge pipe 27.

The springs 18, 21 and 23 are compression springs.

The valve body 16 of the main valve 14 has a port 28 which allows for fluid to be supplied via a pipe 30 from a supply pipe 29 to the regulating cylinder 8 of the continuously variable transmission 1, or for fluid to be discharged via a discharge pipe 31 from the regulating cylinder 8.

The pressure of the fluid supplied by the pump 10 is regulated by an overflow valve 32 which is connected to the above-mentioned supply pipe 29. This pressure is equal to the pressure in cylinder 9 and may be regulated. All the excessive fluid is discharged via a port 33 to a discharge pipe 34.

The control valve 12 is fed via a pipe 35 in which a constant pressure is set by means of a pressure regulating valve 36. The above-mentioned supply pipe 26 is connected to the pipe 35.

It should be noted that the supply pipe 29 goes freely through the controller 13 via a groove 37 provided in the wall.

The control valve 12 regulates the pressure in the room 19 by either supplying fluid from the pipe 35 to the pipe 20, or by discharging fluid from the room 19 and the pipe 20 via a discharge pipe 38. The control valve 12 is in preference driven electronically by means of a control unit 39 which emits signals as a function of different measurements and parameters, such as for example the transmission ratio of the continuously variable transmission 1, the engine speed, etc.

All discharge pipes 27, 31, 34, 38 and the discharge pipe 40 of the pressure regulating valve 36 are connected to the reservoir 11.

The working of the device according to FIG. 1 is described hereafter.

In the state of rest the valve body 16 of the main valve 14 is in the indicated position A. While driving, the pressure in the room 19 is regulated as a function of the above-mentioned measurements and parameters. At each pressure in the room 19 the valve body 16 takes such a position that the force of the spring 18 is in balance with the force exerted by the fluid pressure in the room 22 as well as by the spring 23.

As the transmission ratio is changed, the valve body 16 of the main valve 14 is in such a position, indicated by B, that the port 28 forms an intersection with the supply pipe 29 and the discharge pipe 31.

When a higher pressure is set in the room 19, the valve body 17 of the control valve 15 moves somewhat to the left, as a result of which fluid can run from the pipe 26 via the port 25 to the pipe 24 and the pressure in the room 22 rises. This has for a result that the valve body 16 moves to the right as a result of which the spring 18 is compressed more such that the increased force of the valve body 17 as a result of the pressure rise in the room 19 is compensated. A pressure rise in the room 19 thus results in a movement of the valve body 16 to the right, just as a pressure drop in the room 19 causes a movement of the valve body 16 to the left.

If the pressure in the room 19 is low, the pressure in the room 22 will be low as well and the regulating cylinder 8 will be connected via the pipe 30 and the port 28 to the discharge pipe 31. Thus a small radius of the transmission belt 7 around the primary pulley 3 is obtained.

If the pressure in the room 19 exceeds a certain value, the port 28 will connect the pipe 30 to the supply pipe 29. As a result, fluid is supplied and the radius around the primary pulley 3 increases.

It should be noted that the valve body 17 hardly moves, since the changes of pressure at the side of the room 19 are almost immediately compensated by a change of the force in the spring 18. Thus, a very precise regulation without a noticeable time delay is possible.

Figure 2:
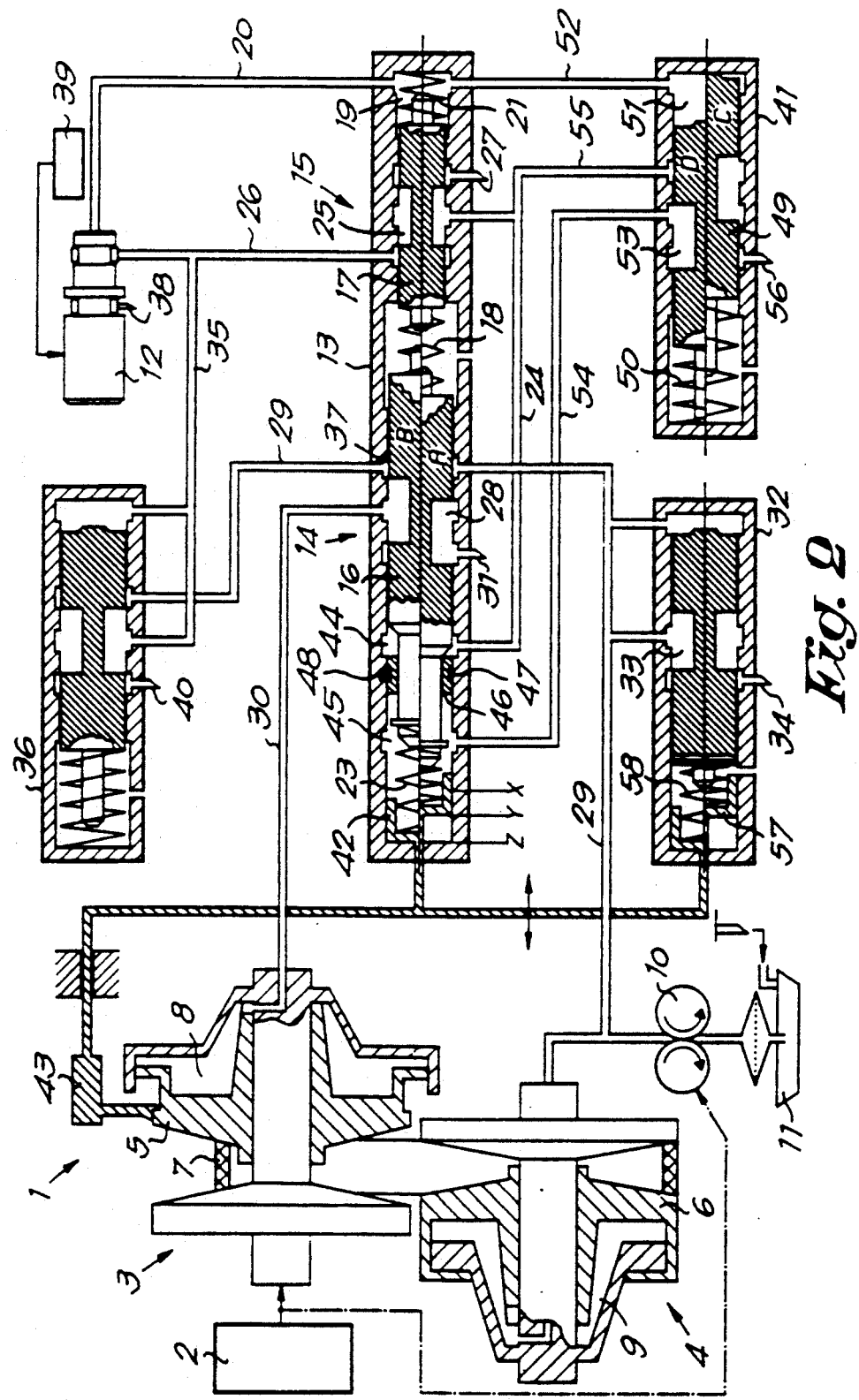
FIG. 2 shows a variant according to the invention.

FIG. 2 shows a variant in which the same parts are indicated with the same references.

The embodiment according to FIG. 2 is special in that means have been integrated in the controller 13 which make it possible for the transmission ratio of the continuously variable transmission 1 to be automatically set at a fixed value when the control means, in this case the control valve 12, fail, in preference halfway between the minimum and maximum transmission ratio, such that one can still drive the vehicle, albeit in a less comfortable way.

As shown in the FIG. 2, these means mainly consist of a switch valve 41, as well as a connection between the moveable pulley half 5 of the primary pulley 3 and the valve body 16 of the main valve 14.

The above-mentioned spring 23 is hereby supported by an element such as a bush 42. The bush 42 is mechanically connected to a tracer finger 43 on the pulley half 5, one and other such that the spring 23 is compressed by means of the bush 42 as the radius of the primary pulley 3 is reduced. Thus, the spring force depends on the transmission ratio.

Along the side of the valve body 16 opposite the side on which the spring 18 acts, two rooms 44 and 45 are formed, whereby these rooms fulfill the same function as the room 22 in the embodiment in FIG. 1. Both rooms 44 and 45 allow for separate forces to be exerted on the valve body 16. The rooms 44 and 45 are hereby separated by a bush 46 which consists of a hollow cylinder with a recess 47 and which is kept in place by means of a pen or ball 48 which has been applied in the wall of the controller.

The switch valve 41 has a valve body 49 which is loaded on the one hand by a spring 50 and on the other hand by a pressure in a room 51 which is connected via a pipe 52 to room 19. In the embodiment in FIG. 2 it is assumed that the control valve 12 is of the type in which, when this control valve 12 fails, the same pressure is set at the outlet as at the inlet. The spring tension of the spring 50 is selected as such in this case that the valve body 49 cannot move against the force of the spring 50 under normal working conditions, but can only move when the pressure in the room 19 is maximal, in other words, when the pressures in the pipes 20 and 35 become equal. As a result, the latter only happens when the control valve 12, in particular the electronics driving the control valve, fail.

Thus, under normal working conditions the valve body 49 is always in the indicated position C. The valve body 49 hereby has a port 53 which in this position C connects the room 45 to the port 25 via pipes 54 and 55. When the control valve 12 fails, the valve body 49 takes the indicated position D, whereby the pipe 55 is closed off and the pipe 54 is connected to a discharge pipe 56 via the port 53.

The working of the device according to FIG. 2 is mainly as described hereafter.

At each pressure in the room 19, the valve body 16 takes such a position that the force of the spring 18 is in balance with the force of the spring 23 and the forces exerted by the fluid pressures in the rooms 44 and 45. When the pressure in the room 19 rises, the valve body 17 moves somewhat to the left, as a result of which fluid can flow from the pipe 35 via the pipe 26 and the port 25 to the pipes 24, 54 and 55, as a result of which the pressure in the rooms 44 and 45 rises. This has for a result that the valve body 16 moves to the right, as a result of which the spring 18 is compressed much more, such that the increased force on the valve body 17 is compensated as a result of the pressure rise in the room 19. A pressure rise in the room 19 in this case also causes a movement of the valve body 16 of the main valve 14 to the right, just as a pressure drop in the room 19 causes a movement of the valve body 16 to the left. The valve body 17 of the control valve 15 hardly moves in the meantime.

When the pressure in the room 19 is low, the pressure in the rooms 44 and 45 is low as well, and the regulating cylinder 8 of the continuously variable transmission 1 is connected via the port 28 to the discharge pipe 31. Thus, a small radius is obtained on the pulley 3. The tracer finger 43 pushes the bush 42 maximally to the right, such that the force of the spring 23 is maximal.

As a higher pressure is set in the room 19, the pressure in the rooms 44 and 45 also increases, and the valve body 16 moves more to the right. As soon as the pressure in the room 19 exceeds a certain value, the port 28 connects the pipe 30 and the regulating cylinder 8 to the supply line 29, as a result of which fluid is supplied and the radius of the transmission belt 7 around the primary pulley 3 increases. The bush 42 moves to the left under the influence of the tracer finger 43, as a result of which the force of the spring 23 decreases. This decreased force is compensated by the increase of pressure in the rooms 44 and 45. In this way, the transmission can be engaged.

As the pressure in the room 19 further increases, the valve body 16 moves further to the right, as a result of which the pressures in the pipes 29 and 30 become equal. The radius of the transmission belt 7 around the primary pulley 3 is hereby maximal, whereas that around the secondary pulley 4 is minimal.

When the control unit 39 fails, the control valve 12 makes an open connection between the pipes 20 and 35, and the pressure in the room 19 becomes maximal. Also the pressure in the room 44 becomes maximal, as this is connected to the supply pipe 26 via the port 25 and the pipe 24. Since the valve body 49 moves to the left under the influence of the high pressure in the room 51, the pressure in the room 45 ceases to exist, in particular because the port 53 connects the pipe 54 to the discharge pipe 56.

If the transmission stands in the drive-off position at the time of failure, in particular in the indicated position X, whereby the primary radius is the smallest, the spring 23 pushed in by the bush 42 will move the valve body 16 somewhat to the right until the port 28 makes a connection between the pipe 30 and the supply pipe 29. The transmission 1 thus starts to gear up, such that the bush 42 is moved to the left and the force of the spring 23 decreases. The whole reaches an equilibrium at one particular force of the spring 23, i.e. at one particular transmission ratio. The characteristics of the spring 23 are hereby selected such that the equilibrium is obtained in an intermediate position Y which is situated about halfway between the lowest position X and the highest position Z.

If the transmission stands in the position Z ("overdrive") at the time of failure, i.e. whereby the primary radius is maximal, the spring 23 will make sure that the transmission 1 gears down until the same equilibrium in the position Y is obtained.

It should be noted that when the electronics fail in the case of the embodiment according to FIG. 1, the transmission automatically gears up to the position in which the transmission belt 7 has the largest primary radius.

As shown in FIG. 2 a bush 57 can also be provided in the overflow valve 32, which is connected to the tracer finger 43 and upon which the spring 58 of the overflow valve 32 relies. It is obtained that when the transmission ratio increases, the pressure in the supply pipe 29 rises and a higher tensile force is realized on the transmission belt 7, whereas the pressure and thus also the tensile force decrease when the transmission ratio drops.

It is clear that the connection between the pulley 3, in particular the tracer finger 43 and the bushes 42 and 57 does not necessarily need to consist of a direct mechanical coupling. The tracer finger 43 could also generate a signal which provides in the movement of the bush 42 and/or 57 in one way or another. The tracer finger 43 may also be mounted on the pulley half 6 of the pulley 4.

Figure 3:
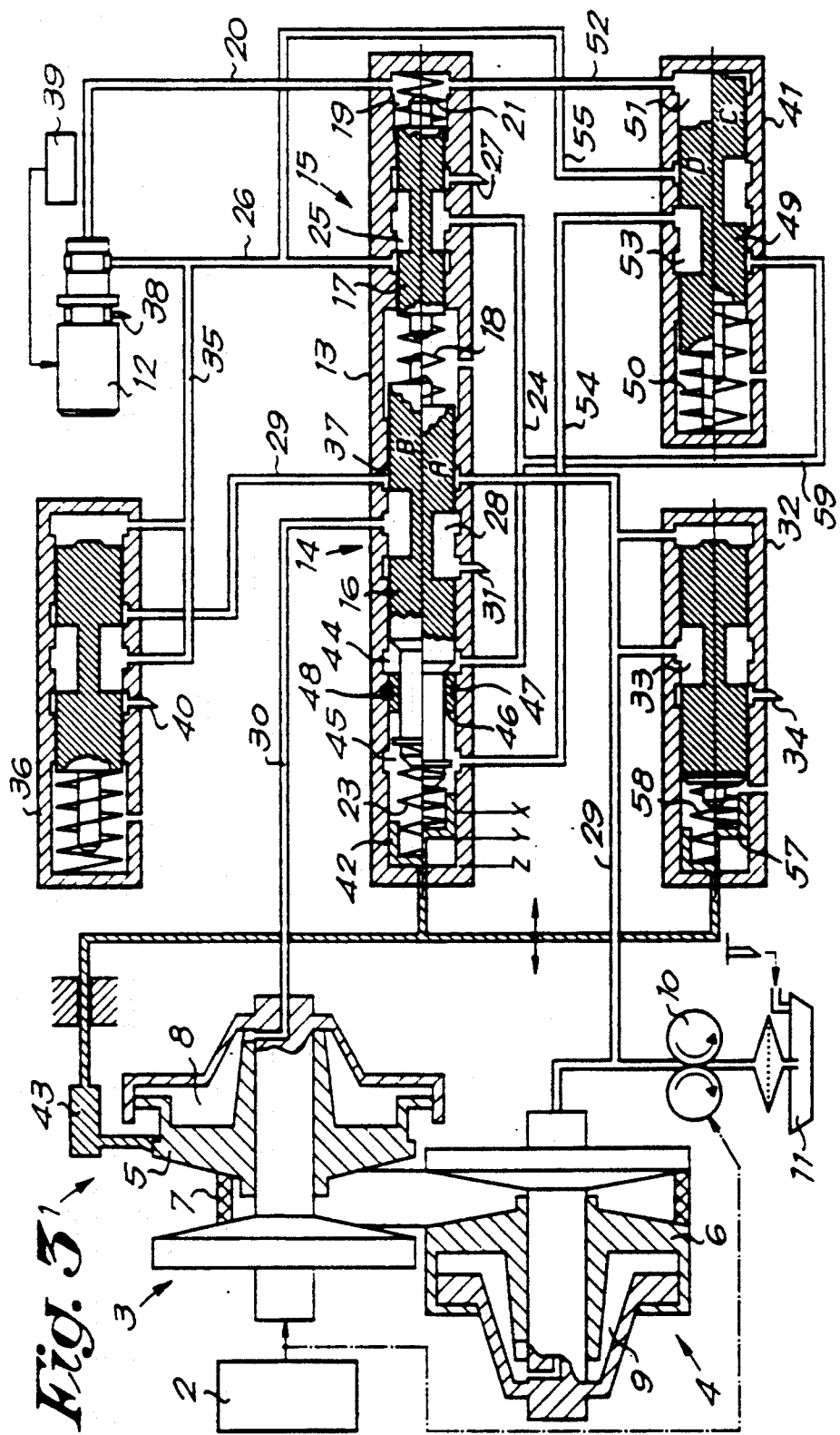
FIG. 3 shows another variant.

It is clear that the invention can also be realized in other embodiments and that it does not depend on the type of control means. In FIG. 3, for example, a variant of the device according to the invention is shown in which it is assumed that the control valve 12 is of the type whereby, when this control valve 12 fails and/or when the electronics driving this control valve 12 fail, the outlet becomes pressureless. The means which allow for the transmission ratio to be set at a fixed value hereby consist of a switch valve 41 which is made such and connected in such a way that when the control means fail any of the above-mentioned rooms is connected to a pipe under constant pressure, for example the pipe 26.

To this end the pipe 55 in this embodiment is connected to the pipe 26 instead of to the pipe 24, and the discharge pipe 56 from FIG. 2 is replaced by a pipe 59 which is connected to pipe 24. The spring tension of the spring 50 is selected such in this case that under normal working conditions the valve body 49 stands in position D, and in position C when the control valve 12 fails. To this end, the spring tension is selected such that the valve body 49 is moved to the left at the slightest pressure in the room 51.

Under normal working conditions, i.e. in position D, the room 45 is then connected to the pipe 24 via the port 53, whereby when the control valve 12 fails, i.e. in position C, the room 45 is connected to the pipe 26 via the port 53.

The present invention is in no way limited to the embodiments described by way of example and shown in the accompanying drawings; on the contrary, such a device for the regulation of a continuously variable transmission in motor vehicles can be made in all sorts of variants while still remaining within the scope of the invention.

I claim:
1. A device comprising:
a continuously variable transmission having a regulating cylinder;
means for supplying a hydraulic medium under a first pressure;
control means for regulating the first pressure; and
a controller including a main valve having a first valve body which regulates the supply and discharge of the hydraulic medium to the regulating cylinder, a control valve having a second valve body, and an elastic device through which said first and second valve bodies operatively cooperate;

wherein said first valve body is subjected to a second pressure regulated by the control valve and the second valve body is subjected to the first pressure, so that a transmission ratio of the continuously variable transmission is continuously varied.

2. A device according to claim 1, wherein the elastic device includes a compression spring disposed between the first and second valve bodies.

3. A device according to claim 2, wherein the control valve has a first room which is pressurized to the first pressure and disposed proximate to the second valve body so that a first force is exerted on the second valve body by the first pressure, and the main valve has a second room which is pressurized to the second pressure and is proximate to the first valve body so that a second force is exerted on the first valve body by the second pressure.

4. A device according to claim 3, wherein the main valve further includes a first spring, the control valve further includes a second spring, and the first and second springs respectively exert third and fourth forces on the first and second valve bodies, respectively.

5. A device according to claim 4, wherein the compression spring exerts a fifth force which is opposed to the third force, and the main valve further includes an element which is coupled to a movable pulley half of the continuously variable transmission, the element supporting the first spring.

6. A device according to claim 5, wherein the element is coupled to the movable pulley half by a mechanical coupling.

7. A device according to claim 5, wherein the main valve has a pressurized third room disposed proximate to the first valve body which exerts a sixth force on the first valve body, and under a normal working condition, pressure in at least one of the second and third rooms is regulated by the control valve.

8. A device according to claim 7, further comprising means for automatically setting the transmission ratio at a fixed value when the control means fails.

9. A device according to claim 8, wherein the automatically setting means includes a switch valve which closes one of the second and third rooms when the control means fails such that an effective surface of the first valve body upon which said second pressure acts is reduced.

10. A device according to claim 9, wherein when the control means fails the first pressure is at a maximum control pressure and the switch valve includes a third spring, a pressurized fourth room which is connected to the first room, and a third valve body having a port therein, wherein the switch valve is loaded by the third spring and the pressurized fourth room, the third valve body is only moved against a force produced by the third spring when a predetermined pressure is exceeded at an outlet of the control means, and the port connects one of the second and third rooms to the control valve via a first pipe when the control means is operating properly and closes the one of the second and third rooms from communication with the control valve and connects it to a discharge pipe when the control means fails.

11. A device according to claim 7, wherein the automatically setting means includes a switch valve through which one of the second and third rooms is connected to a pipe so that the one of the second and third rooms is subjected to a constant pressure when the control means fails.

12. A device according to claim 11, wherein when the control means fails, an outlet of the control means becomes pressureless, and wherein the switch valve includes a third spring, a pressurized fourth room which is connected to the first room, and a valve body having a port therein, wherein the switch valve is loaded by the third spring and the fourth room, the valve body is moved against a forced produced by the third spring when a predetermined pressure at the outlet of the control means is exceeded, and the port connects one of the second and third rooms to a constant pressure source via the pipe when the control means fails.

13. A device according to claim 7, wherein the control valve includes a port through which the hydraulic medium can be supplied to and discharged from at least one of the second and third rooms depending on pressure regulated by the control means.

14. A device according to claim 13, further comprising a pressure regulating valve which supplies the hydraulic medium to the first valve body.

15. A device according to claim 1, wherein the control means includes a controller valve and a control unit which controls the controller valve.

* * * * *